US007587081B2

(12) United States Patent
Rovira-Mas et al.

(10) Patent No.: US 7,587,081 B2
(45) Date of Patent: Sep. 8, 2009

(54) METHOD FOR PROCESSING STEREO VISION DATA USING IMAGE DENSITY

(75) Inventors: Francisco Rovira-Mas, Urbana, IL (US); Qin Zhang, Champaign, IL (US); John Franklin Reid, Moline, IL (US)

(73) Assignees: Deere & Company, Moline, IL (US); The University of Illinois, Urbana, IL (US)

( * ) Notice: Subject to any disclaimer, the term of this patent is extended or adjusted under 35 U.S.C. 154(b) by 558 days.

(21) Appl. No.: 11/343,142

(22) Filed: Jan. 30, 2006

(65) Prior Publication Data

US 2007/0071311 A1    Mar. 29, 2007

Related U.S. Application Data

(60) Provisional application No. 60/721,325, filed on Sep. 28, 2005.

(51) Int. Cl.
*G06K 9/00* (2006.01)
(52) U.S. Cl. .................. 382/154; 382/103; 382/104; 345/419; 701/301
(58) Field of Classification Search .............. 382/103, 382/104, 154; 345/419; 701/301
See application file for complete search history.

(56) References Cited

U.S. PATENT DOCUMENTS

2004/0252863 A1* 12/2004 Chang et al. ............. 382/104

2006/0178828 A1* 8/2006 Moravec ................. 701/211

OTHER PUBLICATIONS

Martin, M.C.; Moravec, H.P. Robot Evidence Grids. Mar. 1996. The Robotics Institute, Carnegie Mellon University.
Moravec, H.P. Robot Spatial Perception by Stereoscopic Vision and 3D Evidence Grids. Sep. 1996. The Robotics Institute, Carnegie Mellon University.
Hart, P.E.; Nilsson, N.J.; Raphael, B. A Formal Basis for the Heuristic Determination of Minimum Cost Paths. *IEEE Transactions of Systems Science and Cybernatics*, vol. SSC-4, No. 2, Jul. 1968.
Schultz, A.C.; Adams, W. Continuous Localization Using Evidence Grids. Proceedings of the 1998 IEEE International Conference on Robotics & Automation, pp. 2833-2839, May 1998.
Wallner, F.; Graf, R.; Dillman, R. Real-Time Map Refinement by Fusing Sonar and Active Stereo-Vision. IEEE International Conference on Robotics and Automation, pp. 2968-2973, 1995.

(Continued)

*Primary Examiner*—Vikkram Bali
*Assistant Examiner*—Daniel Zeilberger

(57) ABSTRACT

An image collection system collects stereo image data comprising left image data and right image data of a particular scene. An estimator estimates a reference three dimensional image density rating for corresponding reference volumetric cell within the particular scene at a reference range from an imaging unit. An image density compensator compensates for the change in image density rating between the reference volumetric cell and an evaluated volumetric cell by using a compensated three dimensional image density rating based on a range or relative displacement between the reference volumetric cell and the evaluated volumetric cell. An obstacle detector identifies a presence or absence of an obstacle in a particular compensated volumetric cell in the particular scene if the particular compensated volumetric cell meets or exceeds a minimum three dimensional image density rating

16 Claims, 11 Drawing Sheets

OTHER PUBLICATIONS

Huber, D.; Carmichael, O.; Hebert, M. 3-D Map Reconstruction from Range Data. Proceedings of the 2000 IEEE International Conference on Robotics & Automation, pp. 891-897, Apr. 2000.

Rovira-Mas, F. Applications of Stereoscopic Vision to Agriculture, 1996.

Rovira-Mas, F.; Reid, J.F. 3D Density and Density Maps for Stereo Vision-Based Navigation. Proceedings of Oct. 7-8, 2004 ASAE Conference [online], Oct. 2004 [retrieved on Jan. 23, 2006]. Retrieved from the Internet:<URL: http://www.asae.frymulti.com/sconference.asp?confid=atoe2004>.

Reid, J.F. Mobile Intelligent Equipment for Off-Road Environments. Proceedings of Oct. 7-8, 2004 ASAE Conference [online], Oct. 2004 [retrieved on Jan. 23, 2006]. Retrieved from the Internet:<URL: http://www.asae.frymulti.com/sconference.asp?confid=atoe2004>.

* cited by examiner

US 7,587,081 B2

METHOD FOR PROCESSING STEREO VISION DATA USING IMAGE DENSITY

This document claims the benefit of U.S. Provisional Application No. 60/721,325, filed on Sep. 28, 2005.

FIELD OF THE INVENTION

This invention relates to a system and method for processing stereo vision data using image density.

BACKGROUND OF THE INVENTION

Stereo vision guidance systems can collect large amounts of three dimensional (3D) vision data, but processing the vision data on a real-time basis to guide a vehicle or avoid obstacles poses difficult technical challenges. For example, stereo mismatches between right image data and left image data, lack of texture information in the image data, deficient illumination during collection of the image data, and other problems make processing of image data burdensome for purposes of vehicular navigation. Accordingly, there is a need for processing stereo vision data that facilitates accurate and timely imaging processing for vehicle navigation applications.

SUMMARY OF THE INVENTION

A method and system for processing stereo vision data using image density (e.g., three dimensional image density) comprises collecting image data comprising left image data and right image data of a particular scene. An estimator estimates a reference three dimensional image density rating for corresponding reference volumetric cell within the particular scene at a reference range from an imaging unit. An image density compensator compensates for the change in image density rating between the reference volumetric cell and an evaluated volumetric cell by using a compensated image density rating based on a range or relative displacement between the reference volumetric cell and the evaluated volumetric cell. An obstacle detector identifies a presence or absence of an obstacle in a particular compensated volumetric cell in the particular scene if the particular compensated volumetric cell meets or exceeds a minimum three dimensional image density rating.

DESCRIPTION OF THE PREFERRED EMBODIMENT(S)

As used herein, "image density" shall refer to the density of a three dimensional data cloud and not to the grey-level intensity or similar property of a two dimensional image.

Figure 1:
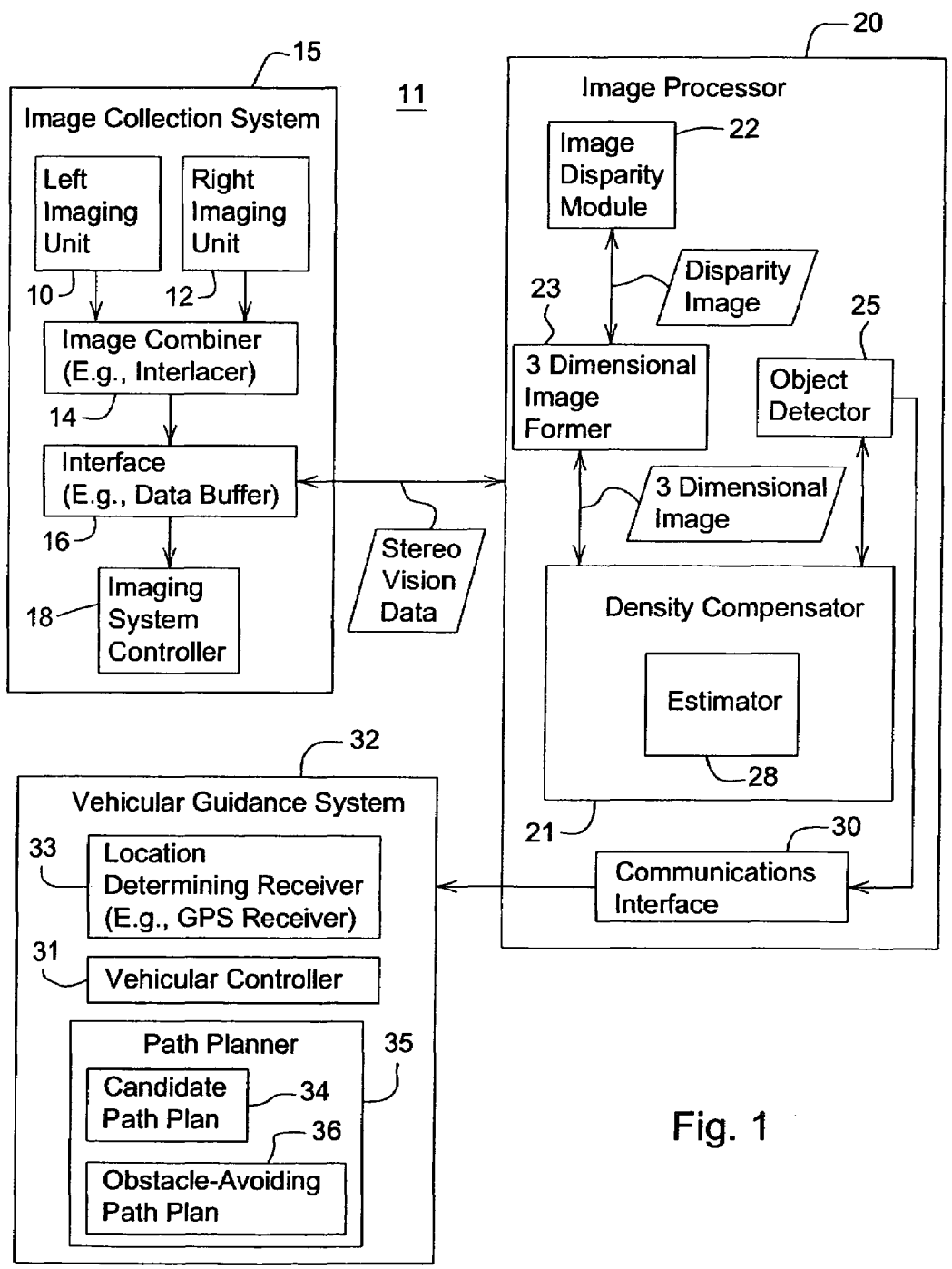
FIG. 1 is a block diagram of a system for obstacle detection using stereo vision in accordance with the invention.

In accordance with one embodiment, FIG. 1 illustrates a detection system 11 for detecting an obstacle or object in a field of view around a vehicle. The detection system 11 comprises an image collection system 15 coupled to an image processor 20. In turn, the image processor 20 is coupled to a vehicular guidance system 32.

The image collection system 15 comprises a left imaging unit 10 and a right imaging unit 12 that are coupled to a stereo image combiner 14 (e.g., an interlacer). The image combiner 14 may be coupled to an interface 16. The interface 16 provides a communications interface (or a data buffer) for the stereo vision data transmitted from the image collection system 15 to the image processor 20. An imaging system controller 18 may control one or more optical characteristics of the left imaging unit 10, the right imaging unit 12, or the format of stereo vision data or image data outputted by the interface 16, for example. Although other image collection systems 15 fall within the scope of the invention, in one embodiment the image collection system 15 comprises a Tyzx stereo image collection system with a DeepSea processing card, available through Tyzx Inc. of Palo Alto, Calif.

The optical characteristics of the imaging units (10, 12) may include any of the following: the aperture of one or both imaging units (10, 12), the effective or actual focal length of one or both imaging units (10, 12), lens parameters of one or both imaging units (10, 12), the sensitivity to luminance and frequency response of one or both imaging units or their components (e.g., charge coupled devices (CCD) or other detectors), resolution of one or both imaging units (10, 12) (e.g., expressed as number of pixels per image or pixel dimensions) and filtering of the output of one or both imaging units (10, 12) for noise, optical distortion, chrominance distortion, luminance distortion, or for lighting variations (e.g., shade versus sunlight). The frequency response of one or both imaging units (10, 12) may support the collection of images in the following frequency spectrum of the electromagnetic spectrum: humanly visible light, a portion of the visible light spectrum (e.g., red light spectrum, green light spectrum and blue light spectrum or other color portions of the humanly visible light spectrum), near-infrared frequency range, the infrared frequency range, the ultraviolet light range, and any combination of the foregoing frequency ranges.

The left imaging unit 10 and right imaging unit 12 gather a pair of raw stereo scene images of the object from spatially offset perspectives at a common time. The left imaging unit 10 and the right imaging unit 12 are offset by a fixed, known spatial amount, which may be referred to as the stereo baseline (b). The image collection system 15 may be mounted on or near the front of the vehicle at a imaging height (e.g., approximately 1.5 meter height) from ground level.

The image combiner 14 combines the raw stereo scene images to produce composite image data or a composite data stream. For example, the composite data stream or stereo vision data may consist of alternating frames, alternating lines of frames, alternating words, bytes, bits, or data packets of left image data from the left imaging unit 10 and right image data from the right imaging unit 12. In one embodiment, the image combiner 14 comprises an interlacer that accepts an input of a left image data stream and a right image data stream and provides an output of an interlaced data stream that contains bytes from both the left image data stream and the right image data stream. The image collection system 15 supports synchronization of images collected from the left imaging unit 10 and the right imaging unit 12 such that images captured at the substantially the same time are associated with one another.

The image processor 20 comprises an image disparity module 22, a three dimensional image former 23, an object detector 25, an image density compensator 21, and a communications interface 30. In one embodiment, the image disparity module 22 communicates with the three dimensional image former 23. In turn, the three dimensional image former 23 communicates the image density compensator 21. The image density compensator 21 communicates with the object detector 25, which communicates to the communications interface 30. The communications interface 30 is an intermediary that manages communications between the image processor 20 and the vehicle guidance system 32.

In one embodiment, the image processor 20 facilitates the determination of a range of the object and the dimensions of an object. The image processor 20 is well suited for creating a three dimensional representation of the object or a scene based on the disparity map image and the stereo vision data.

The image disparity module 22 creates a disparity map image that represents disparity between the raw stereo scene images from the left imaging unit 10 and the right imaging unit 12. The three-dimensional image former 23 accepts an input of a disparity image or other stereo vision image data (e.g., interlaced data stream) of a scene (or object) and produces a three-dimensional representation of the scene (or object) as an output.

In one embodiment, the three dimensional image former 23 may create or form the three-dimensional image representation (e.g. image cloud data) based on one or more of the following types of input data: the disparity image, raw left image data, and raw right image data, stereo vision data, and interlaced image data. The three-dimensional representation may comprise a constellation of data points that lie on the surface of the object (e.g., obstacle), a framework of planar patches or a grid that lie on the surface of the object, a rough block or cubic representation of the maximum dimensions of the obstacle, or another three-dimensional model of the object. The data points on the object, framework that models the object, or another three-dimensional model may be referenced to a position or location data for a moving or stationary vehicle, a stationary reference point, an absolute coordinate system, or otherwise.

The image density compensator 21 may estimate a compensation curve or compensation factor or apply a pre-established compensation factor to compensate for diminishing image density with range from the imaging unit. For example, the 3D image density may decrease according to a generally quadratic curve or linear curve as the range (y coordinate) increased. Compensation formulas may be formulated to correct this tendency and the concept of 3D image density.

In one embodiment, the image density compensator 21 compensates for both intra-image density variation and inter-image density variation. With regards to intra-image density variation or inter-image variation, the 3D image density is directly related to the number of stereo matches (disparity points), and has nothing to do with the physical density of the object perceived. The maximum number of points that a disparity image can yield depends on the image resolution, which complicates the estimation of a threshold to discriminate objects from vacant space. Such a threshold will be affected by the resolution of the image, but also by other factors, as for instance uneven illumination: different light intensity over the same object will render clouds of different 3D image density; poor illumination will create zones of low quality texture, which in turn will generate fewer points in the cloud and vice versa. This irregular behavior between different images or inter-image density variation can be corrected by normalizing the density in the following mode:

$$\text{Norm}[d3D] = \frac{d3D}{\max\ d3D\ \text{in the image}} \quad\quad (A)$$

The normalization proposed in equation A equates the density patterns among different images, but it cannot correct intra-image density variations or levels the density between different areas of the same image. The cause for internal variation resides in the loss of resolution as ranges grow, i.e., the space covered by a specific pixel increases as the distance to the image collection system 15 enlarges.

The object detector 25 may determine or estimate one or more of the following: (1) the range (depth 50) of the object from the image collection system 15 or with respect to the vehicle, (2) the three-dimensional dimensions of the object (e.g., width, depth and height), (3) two-dimensional dimensions of the object (e.g., width and length) and range to the object; (4) whether the object is stationary or moving, (5) velocity, acceleration, speed, or heading of the object relative to the vehicle or relative to a stationary reference point, and (6) an estimated center of mass or geometric center of the object. The range of the object may represent the distance between a surface point on the object and a reference point associated with the vehicle (e.g., optical center of a reference lens or a point along the baseline of the imaging units (10, 12)).

The image density compensator 21 is associated with the object detector 25 and the three dimensional image former 23. The image density compensator 21 may facilitate the identification of an object by allowing the use of a uniform image density threshold per volumetric cell in a scene from stereo image data. An estimator 28 estimates a reference three dimensional image density rating for a corresponding reference volumetric cell. The reference image density rating provides a benchmark that may be used to adjust or compensate for variation of the density rating of other volumetric cells within the scene.

The image processor 20 supports the extraction of an object from background data within the stereo vision data with compensation for variation of the three dimensional image rating versus range from the imaging unit. The image processor 20 extracts an object from background data based on one or more of the following: (1) color information (e.g., pixels or voxels) associated with the image, (2) luminance information (e.g., pixels or voxels) associated with the image, (3) three-dimensional shape data on the object, and (3) dimensions of the object. For example, an object may have a generally uniform color which is distinct from the background data or a particular luminance value of pixels that is distinct from the background data. A voxel refers to a volume pixel or pixel of a three-dimensional image.

For example, the obstacle detector 25 may differentiate an object or obstacle from the background or remainder of an image by one or more of the following techniques: (1) comparing collected color parameters of pixels (or voxels) in an image or portion of an image to reference color parameters of pixels (or voxels) within one or more depth zones or a three-dimensional image, where the reference color parameters represent expected color parameters for an obstruction-free image, (2) comparing derivative collected data derived from collected color parameters to derivative reference data derived from the reference pixel color parameters, (3) comparing a detected image size to a reference object profile size (e.g., typical dimensions of animals, humans, trees, bushes, telephone poles, machines or vehicles) within one or more depth zones of a three-dimensional image. In one embodiment, to identify an object or obstacle in an image or scene around the vehicle, the obstacle detection module 26 may apply a data processing resources of the image processor 20 first to a candidate path plan of the vehicle and a safety clearance zone about the vehicle or such candidate path plan, and secondarily to the entire field of view of the image collection system 15.

The communications interface 30 communicates obstacle location data, obstacle avoidance data, object dimension data, and object range data to a vehicular guidance system 32.

The vehicular guidance system 32 is associated with a location-determining receiver 33, a path planner 35, and a vehicular controller 31. The location determining receiver 33 may comprise a Global Positioning System Receiver (e.g., GPS receiver) with differential correction that provides location data (e.g., instantaneous or real time location data) of the vehicle in terms of coordinates or otherwise.

The path planner 35 is arranged to develop a path plan for the vehicle. The path planner 35 updates a candidate path plan 34 to obtain a preferential path plan or obstacle-avoiding path plan 36 based on the presence, location, velocity and bearing of objects around the vehicle to avoid collisions between the vehicle and the object. For example, the path planner 35 may be based on a search algorithm to search for the minimum cost path between an originating point and a destination point, with due consideration of object data or obstacle data provided by the object estimator 25. The path planner 35 is capable of finding a preferential or optimum path that avoids one or more objects or obstacles present in the field of view.

In one embodiment, a vehicular guidance system 32 or path planner 35 establishes an obstacle avoidance zone for the vehicle based on the estimated range and dimensions of the object. In another embodiment, the vehicular guidance system 32 or path planner establishes an obstacle avoidance zone based the on estimated range of the object, dimensions of the object, and movement of the object. In still another embodiment, the vehicular guidance system 32 or path planner establishes an obstacle avoidance zone based the on estimated range of the object, dimensions of the object, and a candidate path plan 34. The candidate path plan 34 may be interrupted, stopped, or changed based on one or more of the following: obstacle avoidance zone, row location data, obstacle location data, object dimension data, and object range data.

The vehicular controller 31 may be associated with a braking system, a steering system, and a propulsion system to control the acceleration, movement direction, stopping of a vehicle, or general driving of the vehicle.

The vehicular guidance system 32 performs three main functions: a path planner 35 that to detects any material obstacles in front of the vehicle, a path-planner 35 to find the optimum or preferential path between the current vehicle's position and a target point, and vehicular guidance system 32 to execute navigational commands consistent with the preferential path plan. In the image processor 20, the object detector 25 identifies objects or obstacles by using density grids to determine the presence or absence of an object or obstacle with the enhanced reliability of 3D density compensation. The vehicular guidance system 32 or the path planner 35 relies on the communication of the detected object data (e.g., object coordinates), data on presence of any object, or data on the absence of an object from the object detector 25 to properly guide the vehicle. Although other configurations are possible and fall within the scope of the invention, the vehicular guidance system 32 and the image processor 20 may be housed in different computers or data processing systems that communicate via a transmission line (e.g., an Ethernet cable).

Figure 2:
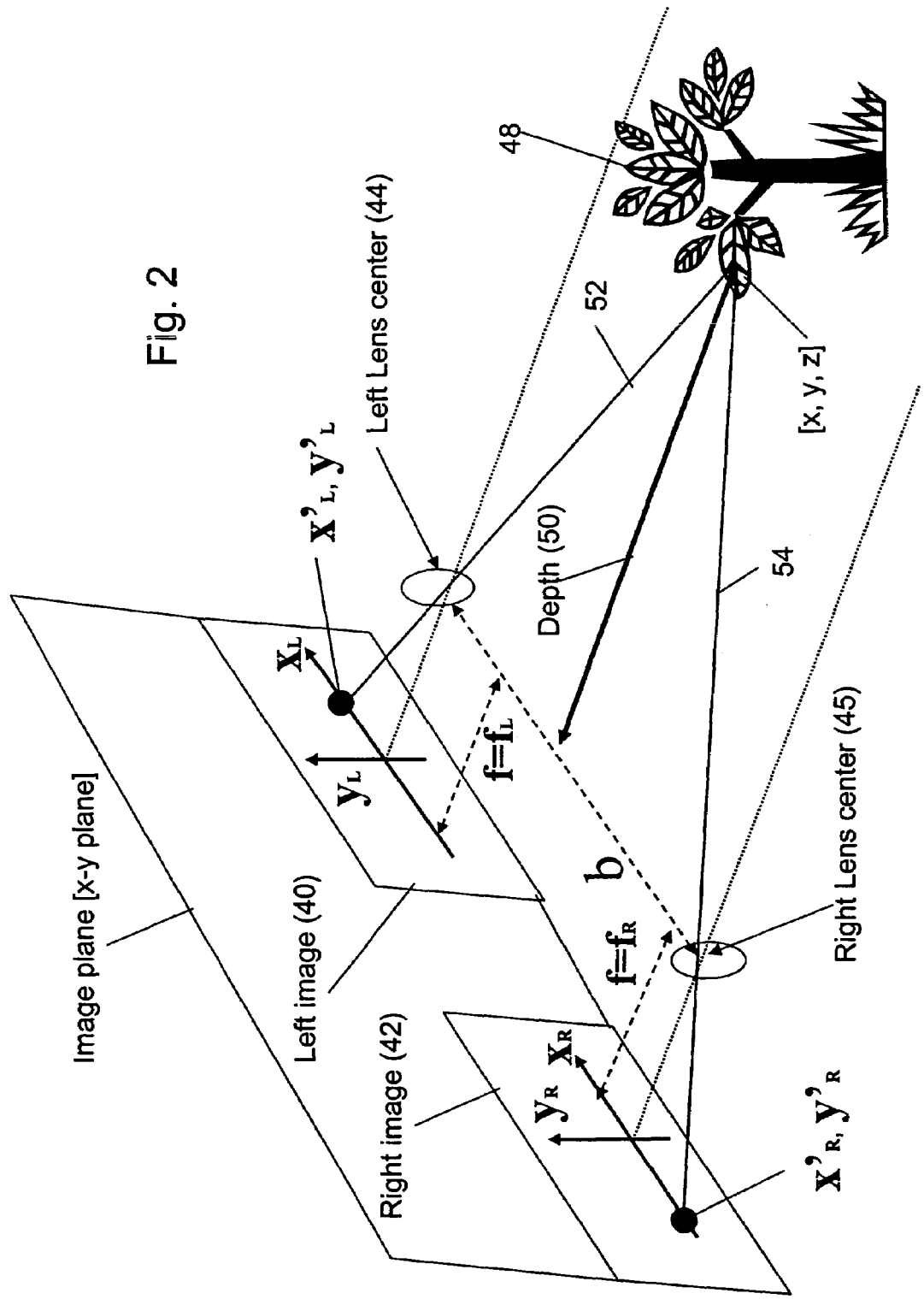
FIG. 2 shows a diagram that illustrates collection of stereo vision data and determination of three-dimensional world coordinates for an object in a scene.

FIG. 2 is an illustration of a typical representation of how three-dimensional information on an object is extracted from an image collection system 15 that collects stereo vision images. A right lens center 45 and a left lens center 44 are associated with the right imaging unit 12 and the left imaging unit 10, respectively. The right lens center 45 and left lens center 44 may represent central regions of the lenses of the imaging units. A dashed reference line, labeled "b" for stereo baseline b, interconnects the right lens center 45 and the left lens center 44. The first imaging unit 10 and the second imaging unit 12 are separated by a distance associated with the stereo baseline (b). The optical axes of each imaging unit is perpendicular to the stereo base line. An object is shown as a plant 48 here and is separated from baseline b by a depth 50. A group of points on the plant 48 may be expressed as three dimensional information that define the shape, size, and spatial dimensions of the object or plant 48.

The three-dimensional information may be represented in a Cartesian coordinate system, a polar coordinate system, a spherical coordinate system, or otherwise. As illustrated in FIG. 2, the three dimensional information is expressed in accordance with Cartesian coordinates. For example, the three dimensional information may include coordinate values (e.g., x, y, z) for each point on the surface of the plant 48. As illustrated in FIG. 2, the three dimensional information can be referenced to an x-y image plane generally parallel to base line b of the imaging units (10 and 12). A z-axis is perpendicular to or normal to the x-y image plane.

The left image 40 and the right image 42 lie in the image plane (i.e., the x-y plane) in FIG. 2. The left image 40 represents a view of the object (e.g., plant 48 and surrounding image) from the perspective of the left imaging unit 10, which includes the left lens center 44. The right image 42 represents a view of the object (e.g., plant 48 and surrounding image) from the perspective of the right imaging unit 12, which includes the right lens center 45. The right image 42 lies behind the right lens center 45 by a focal length, designed $f_r$; the left image 40 lies behind the left lens center 44 by a focal length designated $f_l$. A left image coordinate system is defined on the left image plane as $x_l$, $y_l$. A right image coordinate system is defined n the right image plane, as $x_r$, $y_r$.

The three dimensional world coordinates of a point in a scene or on an object in the scene are as follows:

$$x = \frac{b(x'_l - x'_r)}{2d}, \quad (B)$$

$$y = \frac{b(y'_l - y'_r)}{2d}, \text{ and} \quad (C)$$

$$z = \frac{bf}{d} \quad (D)$$

where b is the stereo baseline distance between the optical centers of the two imaging units, d is the disparity, which is $x'_l - x'_r$, and f is the effective focal length of the imaging units for the case where $f = f_r = f_l$, $x'_l$ is the $x_l$ coordinate on the left image of the image plane corresponding to the point on the object, $y'_l$, is $y_l$ coordinate on the coordinate on the left image plane, $x'_r$ is the $x_r$ coordinate on the right image of the image plane corresponding to the point on the object, and $y'_r$ is $y_r$ coordinate on the coordinate on the right image plane. The z dimension is synonymous with the depth of a point on the object.

The above equations may be applied repeatedly as a vehicle equipped with the obstacle detection system 11 moves throughout a work area or its environment to capture a group of stereo scene images on one or more objects from different perspectives. As a vehicle moves additional stereo images may be used to extract further three-dimensional information on the same object. Accordingly, a three-dimensional reconstruction of the dimensions and range of object may be based on three dimensional image points calculated from different perspective locations of the vehicle and registered to a common reference or coordinate system with respect on one another. Registration of different stereo images taken from different positions may be accomplished by selecting portions of the scenes and matching for luminance or intensity of the pixels or voxels, among other possible techniques.

An object detector 25 or image processor 20 may apply color discrimination, texture comparison, or both to identify one or more objects or obstacles in a stereo image. The object detector 25 or image processor 20 may identify a potential object or obstacle by identifying a local group or cluster of corresponding substantially similar luminance values, color values (e.g., in RGB color space, or otherwise), and/or texture characteristics of near or adjoining pixels or voxels in an image. Color values associated with human skin tones or clothing, may be used as references to identify humans as obstacles or objects. Groups or clusters of similar color values may be associated with each data point to form a voxel or another multidimensional representation of an object. The texture defines one or more of following texture characteristics of a surface of an object: contrast, coarseness, directionality, regularity, and roughness (or smoothness). Contrast refers to the vividness of a pattern associated with the surface of the object. Contrast may represents the variance between the gray-level of different pixels or voxels within the image. Coarseness measures the scale or granularity of the surface of an object. Directionality describes whether or not the object is isotropic or anisotropic in visual appearance. Regularity refers to likeness in two or more portions associated with the surface of an object. Roughness measures a perceived variation in the surface height of the surface of an object.

Stereo mismatches may occur between the right image data and the left image data. When a pixel is wrongly paired, the coordinates of the corresponding point associated with an object will be incorrect, sometimes pointing at an unlikely, if not impossible, location. The image processor 20, including the image density compensator 21, addresses stereo mismatches. For example, the image disparity module 22 may comprise a filter for filtering out or discarding stereo mismatches.

In one embodiment, the image processor 20 may apply a validity box limitation or a bounded approach, which consists of defining bounds for the targeted space in front of the camera. For example, if a vehicle is navigating inside an orchard when the height of the trees is around 3 meters, and the height of the vehicle is 2 meters, any point standing higher than 5 meters will be neglected and eliminated from the initial three dimensional representation (e.g. initial cloud).

Figure 3:
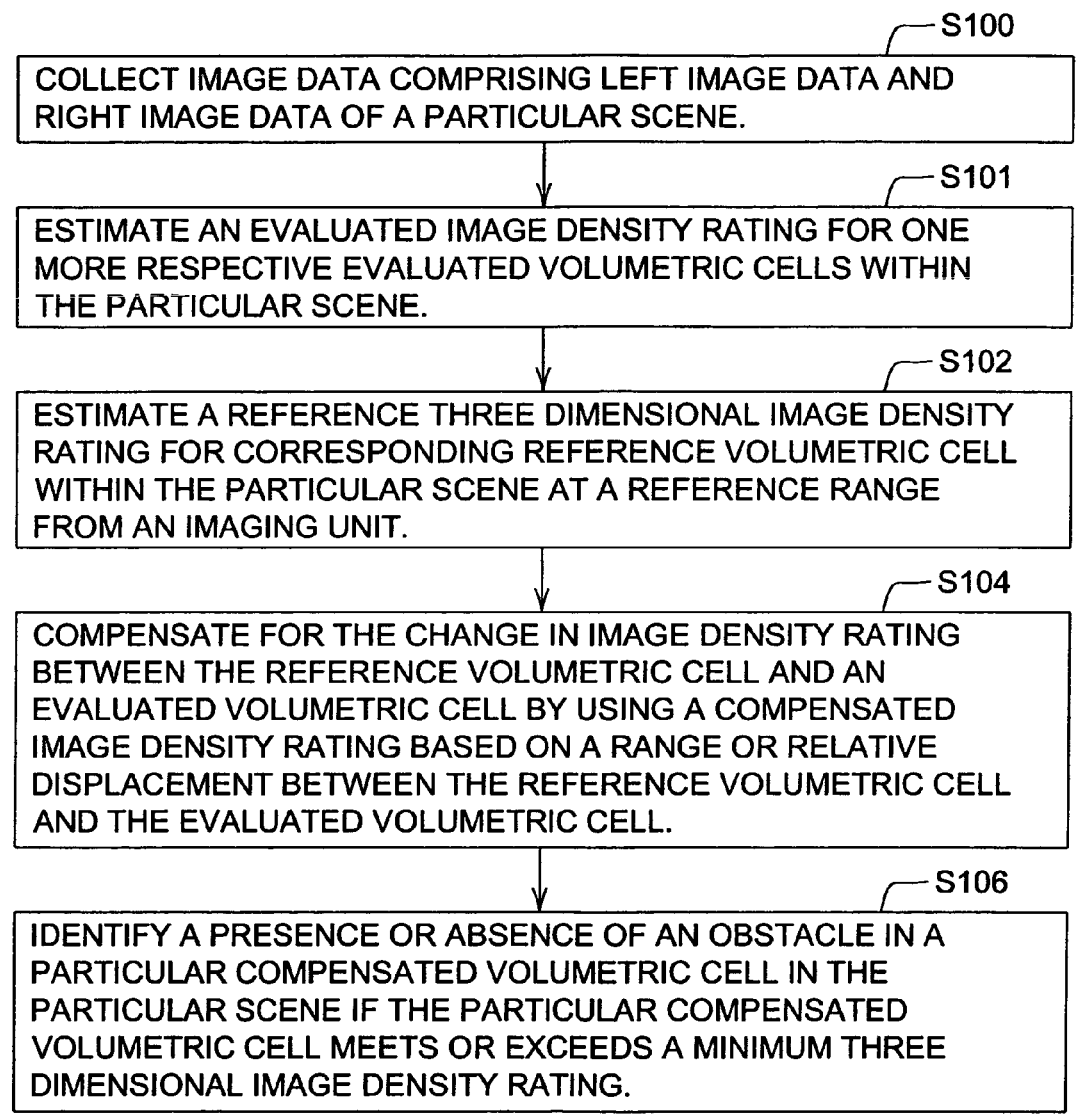
FIG. 3 is a flow chart of a first embodiment of a method for processing stereo vision data using three dimensional image density.

FIG. 3 illustrates a method for processing images using three dimensional image density data. The method of FIG. 3 begins in step S100.

In step S100, an image collection system 15 collects image data comprising left image data and right image data of a particular scene. After collection of the left image data and the right image data, the image processor 20 may organize stereo image data as a three-dimensional cloud of points given in ground coordinates or referenced to another reference frame. The location determining receiver 33 provides vehicular coordinates, imaging unit coordinates, or ground coordinates that may be associated with the corresponding collected image data. The location determining receiver 33 may facilitate determination of the coordinates of the left imaging unit 10, the right imaging unit 12, or another imaging unit at the time when each corresponding image is collected.

In step S101, an estimator 28 or image processor 20 estimates an evaluated image density rating for one or more respective evaluated volumetric cells within the particular scene. In one embodiment, the evaluated three dimensional image density rating comprises the number of stereo matched points or pixels within the evaluated volumetric cell.

Density, as distinguished from three dimensional image density, is a physical property of objects that relates the mass of a substance and the volume that it occupies. A three dimensional image density is a property of stereovision 3D (three dimensional) clouds that can be defined in such a way that relates the number of detected points and the volume in space occupied by them. The three dimensional image density may be referred to as 3D image density (d3D), and is defined as the number of stereo-matched points per volume unit. The mathematical expression for the 3D image density is given by:

$$d3D = \frac{N}{V} \quad (E)$$

where V is the volume of space considered, N is the total number of points inside V, and d3D is the 3D image density. An attribute of the 3D image density is that, by definition, it is independent of the cell's size, in the same way the density of a liquid is independent of the size of its container.

To reduce the data processing resources and improve processing throughput, in one embodiment of step S101, the evaluated volumetric cells may be confined to a volume of interest in the particular scene. The volume of interest may cover the field of view of the image collection system 15 or a lesser volumetric region (e.g., cells within the projected path or path plan of the vehicle). The estimator 28 or image processor 20 computes the 3D image density for each cell within the volume of interest.

The entire scene or the volume of interest is divided into a regular grid comprised of volumetric cells or cells. The size of each sampled cell will be selected to detect certain objects of minimum size and neglect other objects. In one example, the cells are uniform in size within the entire grid. Although the size of the cells in the grid may be generally uniform, the 3D image density is comparable among different grids or grid portions with different cell sizes because it does not depend on the size of the cell by definition.

In step S102, an estimator 28 or image processor 20 estimates a reference three dimensional image density rating for a corresponding reference volumetric cell within the particular scene at a reference range from an imaging unit. In one embodiment, the reference three dimensional image density rating comprises the number of stereo matched points or pixels within the reference volumetric cell. In another embodiment, the reference three dimensional image density comprises an image density associated with at least one of an average range, a mean range, a mode range, or a density-weighted average of the scene or the volume of interest.

Although step S101 precedes step S102 in FIG. 3, step S101 and step S102 may be executed in any order with respect to each other. In other words, steps S101 and S102 may be executed simultaneously, or step S101 may be executed before during, or after step S102.

In step S104, a density compensator 21 or image processor 20 compensates for the change in image density rating between the reference volumetric cell and one or more evaluated volumetric cells by using a compensated image density rating based on a range or relative displacement between the reference volumetric cell and the evaluated volumetric cell.

Step S104 may be carried out applying various techniques, which may be applied individually or cumulatively. Under a first technique, the image density compensator 21 applies image density compensation (e.g., 3D image density compensation) to volumetric cells having a further range from the imaging unit than the reference volumetric cell. Here, the reference volumetric cell may comprise volumetric cell with a known range from the image collection system 15, where such reference volumetric cell has an average, mean, or mode three dimensional density rating.

Under a second technique, the image density compensator 21 does not apply image density compensation (e.g., 3D image density compensation) to the volumetric cells having closer range from the imaging unit than the reference volumetric cell. The second technique may be applied cumulative with the first technique, as previously noted.

Under a third technique, the image density compensator 21 applies an image density compensation curve that is a function of baseline between a left imaging unit and a right imaging unit of the imaging unit, focal length of the imaging unit, and pixel size of the imaging unit or in accordance with the constant $$K_s = \frac{b \cdot f}{w},$$

where w is the pixel size, b is the baseline, f is the focal length of the lenses of the imaging units (10, 12). The above equation for constant $K_S$ may also be referred to as equation F.

Under a fourth technique, the image density compensator 21 applies image density compensation that conforms to the following equation (G):

$$d3D_C(Y) = d3D(Y) \cdot \frac{d3D_{TH}(Y_R)}{d3D_{TH}(Y)},$$

where the $d3D_c(Y)$ is the compensated three dimensional image density as a function of the range Y, $Y_R$ is the reference range, where $d3D_{TH}=K_s \cdot 10^5 \cdot Y^{-2}$, and where $$K_s = \frac{b \cdot f}{w},$$

where w is the pixel size, b is the baseline, f is the focal length of the lenses of the imaging unit.

Under all of the above compensation techniques, the volume of the volumetric cells remains constant prior to and after the compensation for the change in image density rating.

In step S106, an object detector 25 or image processor 20 identifies a presence or an absence of an obstacle in a particular compensated volumetric cell in the particular scene if the particular compensated volumetric cell meets or exceeds a minimum three dimensional image density.

The object detector 25 determines whether a particular set of points indicates the presence of a solid object, or on the contrary it comprises a sparse number of noisy points, randomly distributed, in a portion of the scene actually occupied by empty space. The image processor 20 and object detector 25 needs to avoid the unawareness of existing objects, and the pseudo-detection of inexistent objects (false positives) through stereo perception. In addition, not only the detection of objects is the ultimate goal, but also the acknowledgement of their dimensions and other properties that might be of interest for a particular application.

Because all the three-dimensional information is carried by the cloud of points, one possible logic starting point for the object detector 25 is to count the number of points and analyze their distribution in the sensed space. However, an absolute count is not effective because the number of points grows as the space or coverage area covered by the image collection system 15 increases. For example, a generally planar coverage area in a vertical plane covered by the image collection system 15 increases with increasing horizontal distance from the image collection system. Accordingly, the three dimensional image density is used by the object detector 20 to accurate determine whether or not an object is present in one or more volumetric cells of a scene.

Figure 4:
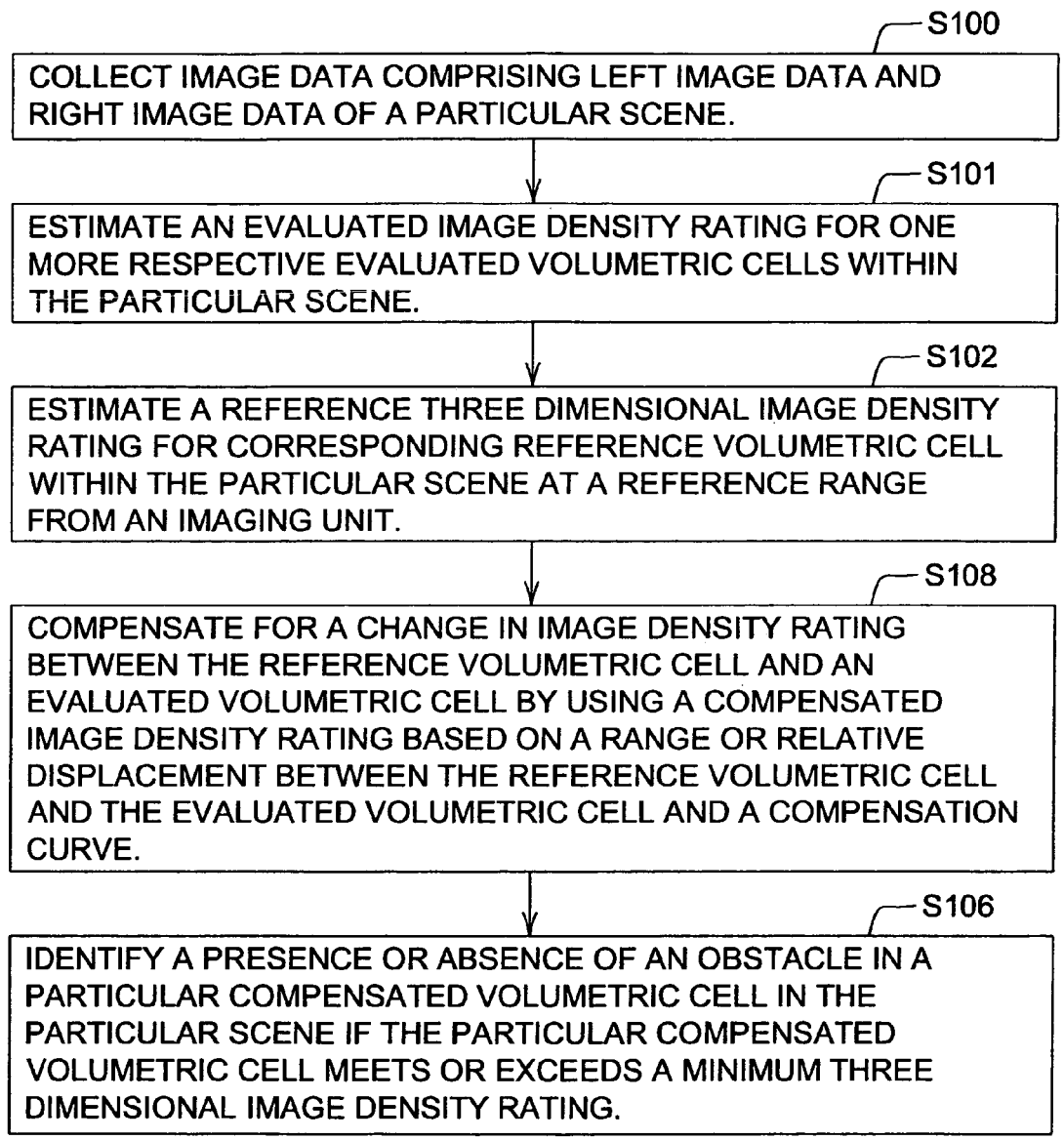
FIG. 4 is a flow chart of a second embodiment of a method for processing stereo vision data using three dimensional image density.

The method of FIG. 4 is similar to the method of FIG. 3, except the method of FIG. 4 replaces step S104 with step S108. Like reference numbers in FIG. 3 and FIG. 4 indicate like steps or procedures.

Step S108 may be executed following step S102. In step S108, a density compensator 21 or image processor 20 compensates for a change in image density rating between the reference volumetric cell and an evaluated volumetric cell by using a compensated image density rating based on a range or relative displacement between the reference volumetric cell and the evaluated volumetric cell and a compensation curve. The compensation curve may comprise a function of compensated image density versus range for volumetric cells with respect to the reference volumetric cell. Further, the compensation curve may cover compensated image density versus range for volumetric cells between the reference volumetric cell and the evaluated volumetric cell. The compensation curve may comprise one or more of the following curves: a generally linear curve, a generally quadratic curve, and a generally cubic curve. The shape of the compensation curve may depend upon the characteristics of the imaging collection system 15, among other factors. The shape of the compensation curve should be selected to mirror of compensate for the response of the density versus range response of the imaging collection system 15.

Step S106 may follow step S108, as shown in FIG. 4.

Figure 5:
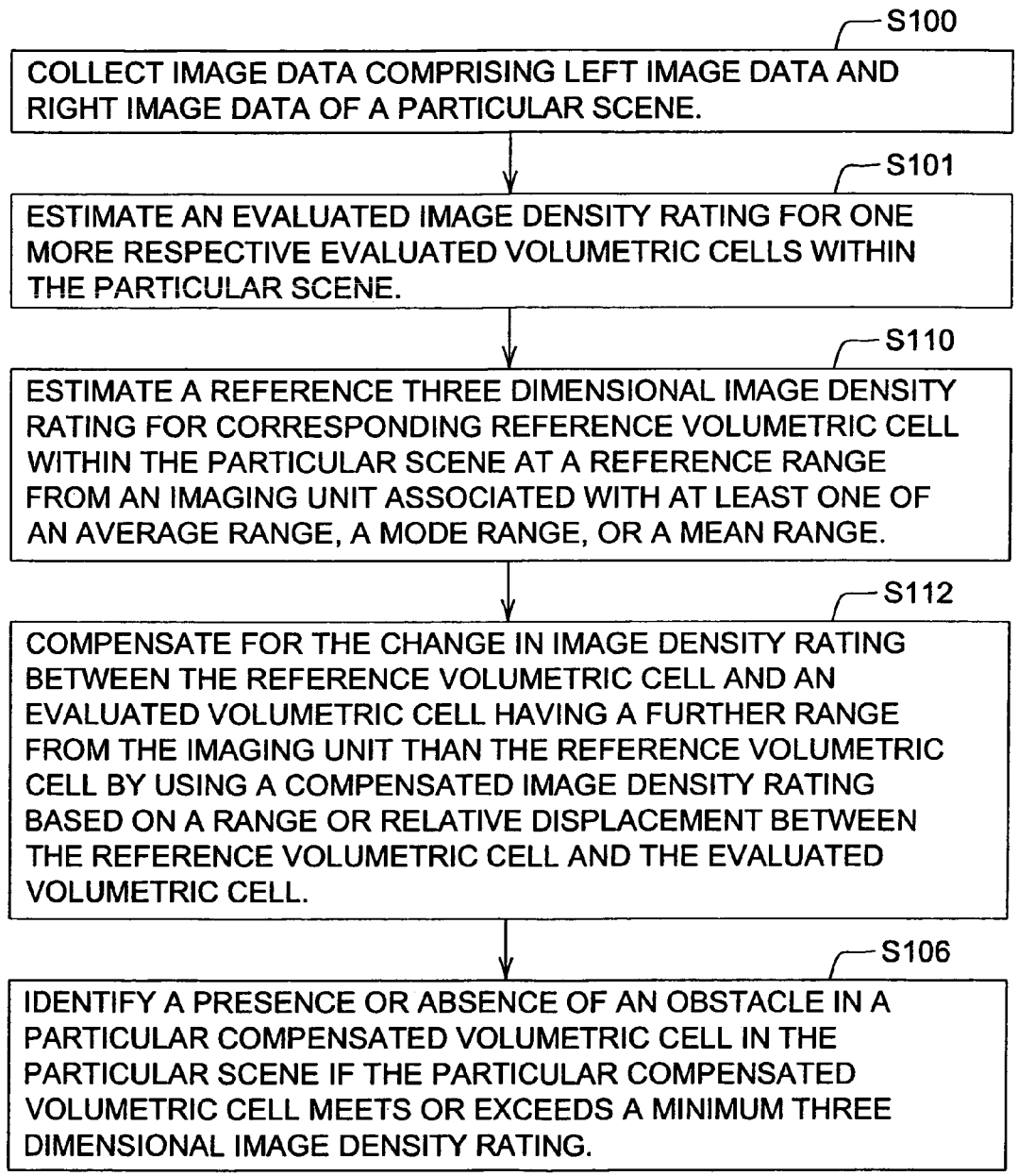
FIG. 5 is a flow chart of a third embodiment of a method for processing stereo vision data using three dimensional image density.

The method of FIG. 5 is similar to the method of FIG. 3, except the method of FIG. 5 replaces step S104 with step S112. Like reference numbers in FIG. 3 and FIG. 5 indicate like steps or procedures.

In step S112, a density compensator 21 or an image processor 20 compensates for the change in image density rating between the reference volumetric cell and an evaluated volumetric cell having a further range from the imaging unit than the reference volumetric cell by suing a compensated image density rating based on a range or relative displacement between the reference volumetric cell and the evaluated volumetric cell.

Step S106 may follow step S112 in FIG. 5.

Figures 6A, 6B:
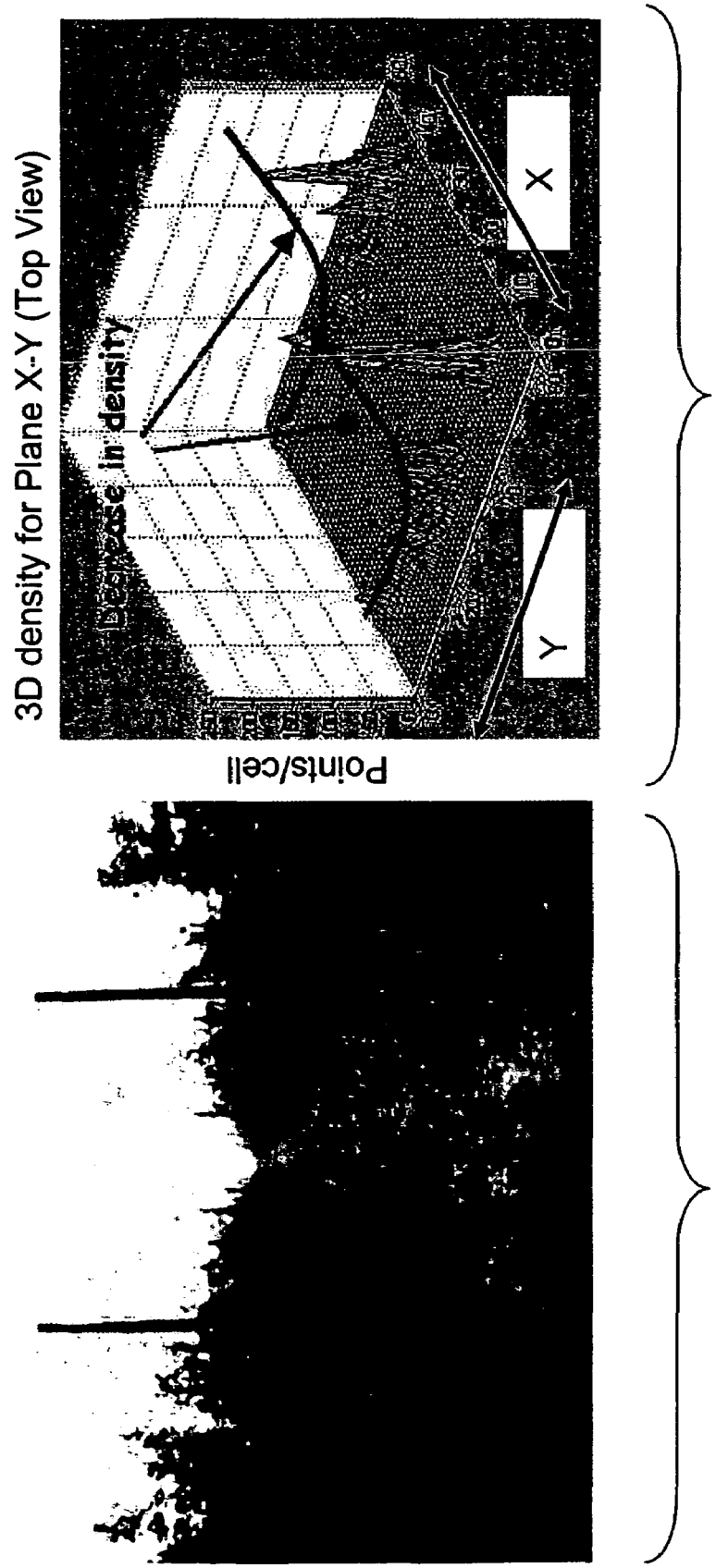
FIG. 6A is an image of a scene (e.g., a typical orchard scene).
FIG. 6B shows an internal variation or intra-image variation of a three dimensional image density for the scene of FIG. 6A.

FIG. 6A and FIG. 6B, collectively, illustrate the problem of internal variation of density in an orchard scene. The image captured by the left imager is given in FIG. 6A, and the 3D image density (stereo-matched points per cell) is shown in FIG. 6b. Notice the non-linearity of the density with respect to the range (Y axis in FIG. 6B).

In FIG. 6A and FIG. 6B, the uneven density distribution within a single image in FIG. 6 requires a specific internal normalization denominated $d3D_C(Y)$. A mathematical expression for $d3D_C(Y)$ is deduced in the following paragraphs. Because the cause of variation in three dimensional image density is a loss of pixel resolution dependent on the range, the first potential source of information may be found at the expression for the range resolution of a stereo image in accordance with the following expression (equation H):

$$\Delta R = \frac{w}{b \cdot f} \cdot R^2 \cdot \Delta d, \qquad (H)$$

where $\Delta R$ is the range resolution, w is the pixel size, b is the baseline, f is the focal length of the lenses, $\Delta d$ is an increment in the disparity, and R is the range or reference range of a cell or volumetric cell with respect to the image collection system 15. The baseline b and the focal length f have been previously defined in the text accompanying FIG. 2. Equation H displays a quadratic trend. This expression was introduced in a theoretical expression (equation L) that relates range and density.

Figures 7A, 7B:
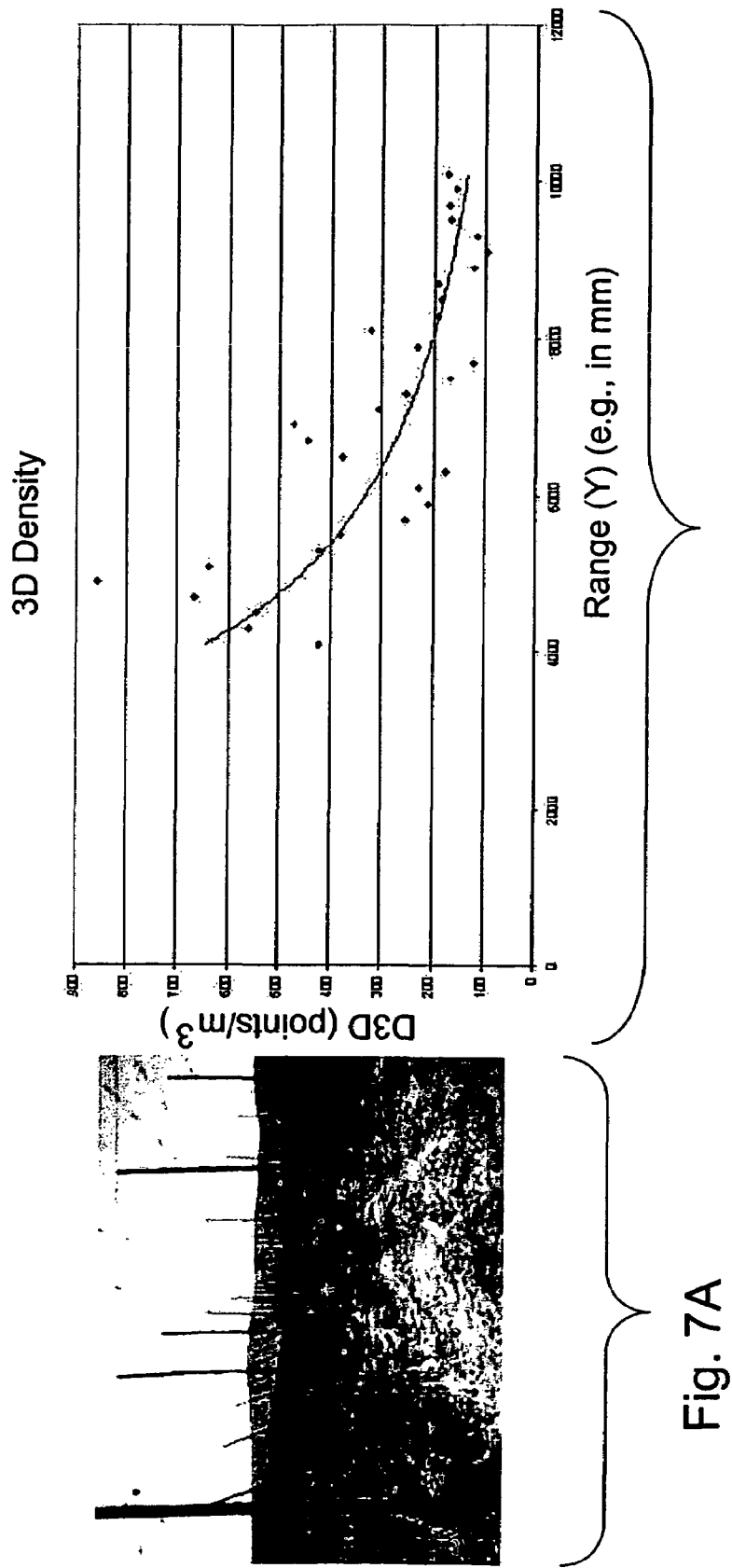
FIG. 7A is an image of another scene (e.g., agricultural field).
FIG. 7B shows the relationship between three dimensional image density and range from the image collection system.

FIG. 7B shows the decreasing trend of the 3D image density as ranges increase. The same plot also includes the best fit for the relationship between the range and the 3D image density. The sample image acquired in the field is represented in FIG. 7A. The mathematical expression for the curve fitted to the experimental data plotted in FIG. 7 is:

$$d3D = 10^9 \cdot Y^{-1.7481}, \qquad (I)$$

where Y is the range in mm and d3D is the 3D image density in points/m³.

For a given stereo system, the basic parameters that define the properties of the image collection system 15 b, f, and w, are fixed, and can be combined in a constant factor $K_S$, as stated in equation J:

$$K_s = \frac{b \cdot f}{w} \qquad (J)$$

If equation J is combined with equation H, and taking into account that the image collection system 15 constant $K_S$ for the system employed in FIG. 6 and FIG. 7 is 110000, the range resolution for this stereo system is given by the following expression:

$$\frac{\Delta d}{\Delta R} = 110000 \cdot R^{-2} \qquad (K)$$
$$= K_s \cdot Y^{-2}$$

According to the definition of 3D image density, there is a direct relationship between the disparity and the 3D image density; the d3D is proportional to the number of stereo-matches. On the other hand, experimental data shows that the 3D image density decreases as the range enlarges. These two facts lead to the conclusion that there must be a proportional relationship between the range resolution (equations H and K) and the 3D image density. If a proportionality constant of $10^5$ to make units compatible is added to equation K, a theoretical expression that relates the 3D image density and the range can be found, as given in equation L:

$$d3D_{TH} = 11 \cdot 10^9 \cdot Y^{-2} = K_s \cdot 10^5 \cdot Y^{-2}, \qquad (L)$$

where $d3D_{TH}$ is the theoretical expression of the 3D image density as a function of the range Y. Now the theoretical expression of the 3D image density can be compared with the actual values of the d3D found in the field.

Figure 8:
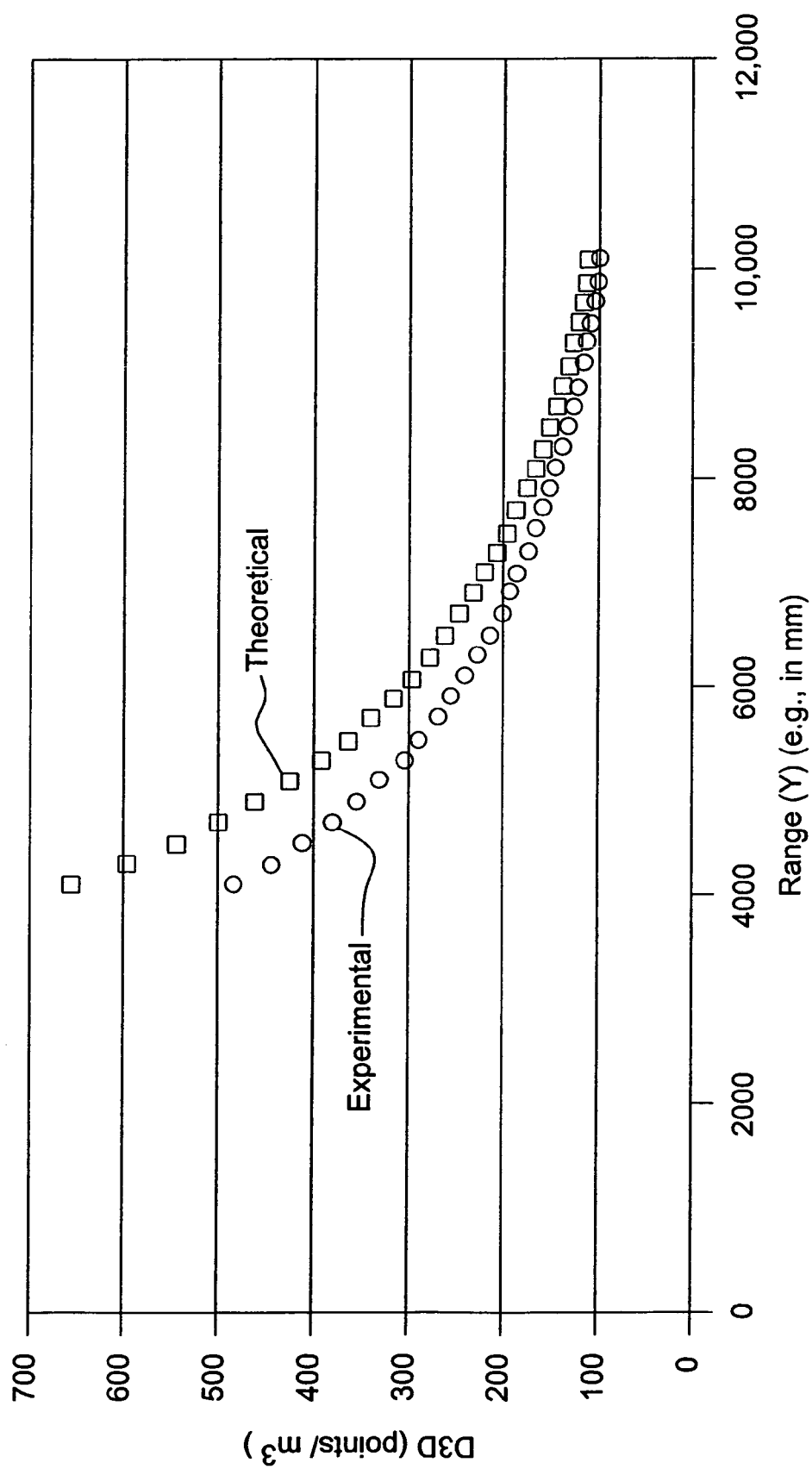
FIG. 8 shows an experimental relationship and a theoretical relationship between three dimensional image density and range of image data from the image collection system.

FIG. 8 shows such comparison of experimental and modeled results. In FIG. 8, the experimental relationship or experimental curve is shown as a series of circular points, whereas the theoretical relationship or theoretical curve is shown as a series of rectangular points.

Figure 9:
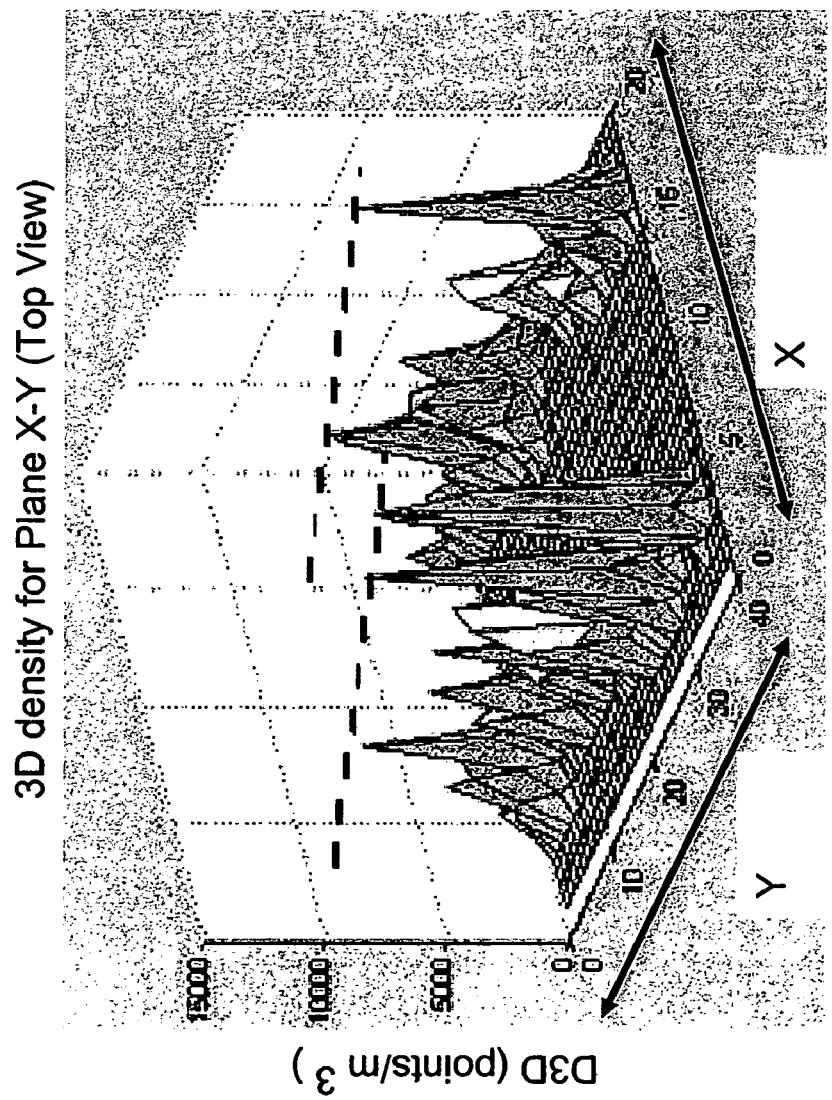
FIG. 9 shows three dimensional image density for the scene of FIG. 6A after the density has been range-compensated.

The analysis of various sets of experimental data led to expressions similar to equation l, with exponents of magnitude close to −2. If a unique threshold is to be applied to the entire image, some sort of compensation has to be introduced in the formula of the 3D image density such that large and small ranges can be compared. With this modification, the same threshold can be used to discriminate objects according to their density for any range inside the image. The correction proposed used the theoretical expression of equation L to normalize any density to a pre-selected reference range. In the examples studied in FIGS. 6, 7 and 8, the reference range $Y_R$ was set at Y=4500 mm. The resulting expression, given as an example of the methodology, is shown in equation M:

$$d3D_C(Y) = d3D(Y) \cdot \frac{d3D_{TH}(Y_R)}{d3D_{TH}(Y)} \qquad (M)$$
$$= d3D(Y) \cdot \frac{11 \cdot 10^9 \cdot 4500^{-2}}{11 \cdot 10^9 \cdot Y^{-2}}$$
$$= 4.94 \cdot 10^{-8} \cdot Y^2 \cdot d3D(Y)$$

where the $d3D_c(Y)$ is the compensated 3D image density as a function of the range Y measured in mm, $d3D_{TH}$ is defined above in equation L, and $Y_R$ is the reference range. This new expression presented in equation M was applied to the scene presented in FIG. 5. The compensated 3D image density is depicted in FIG. 9. Note how the 3D image density does not decay with the increase of the range as quick as in FIG. 6B. The effect of the range-compensation can be weighted comparing FIG. 9 and FIG. 6B: the scene is the same but the 3D image density presents a more uniform pattern in FIG. 8. Without this correction, a different threshold is needed for distant objects given that fewer points represent them. The threshold employed to differentiate objects from empty space was determined by in-field calibration, since every scene requires a particular treatment.

Figure 10:
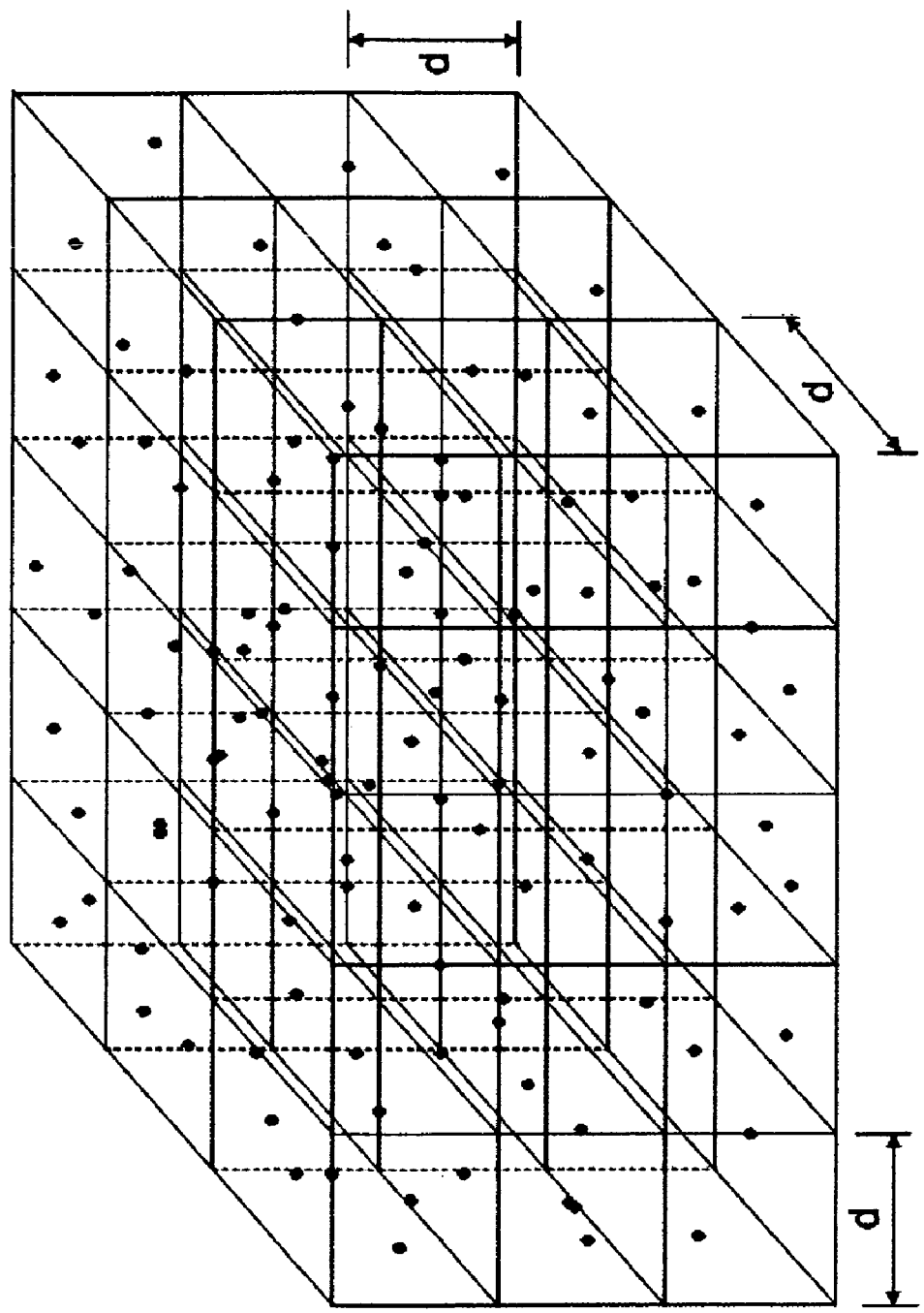
FIG. 10 is a diagram of a three dimensional grid for stereo perception.
Figure 11:
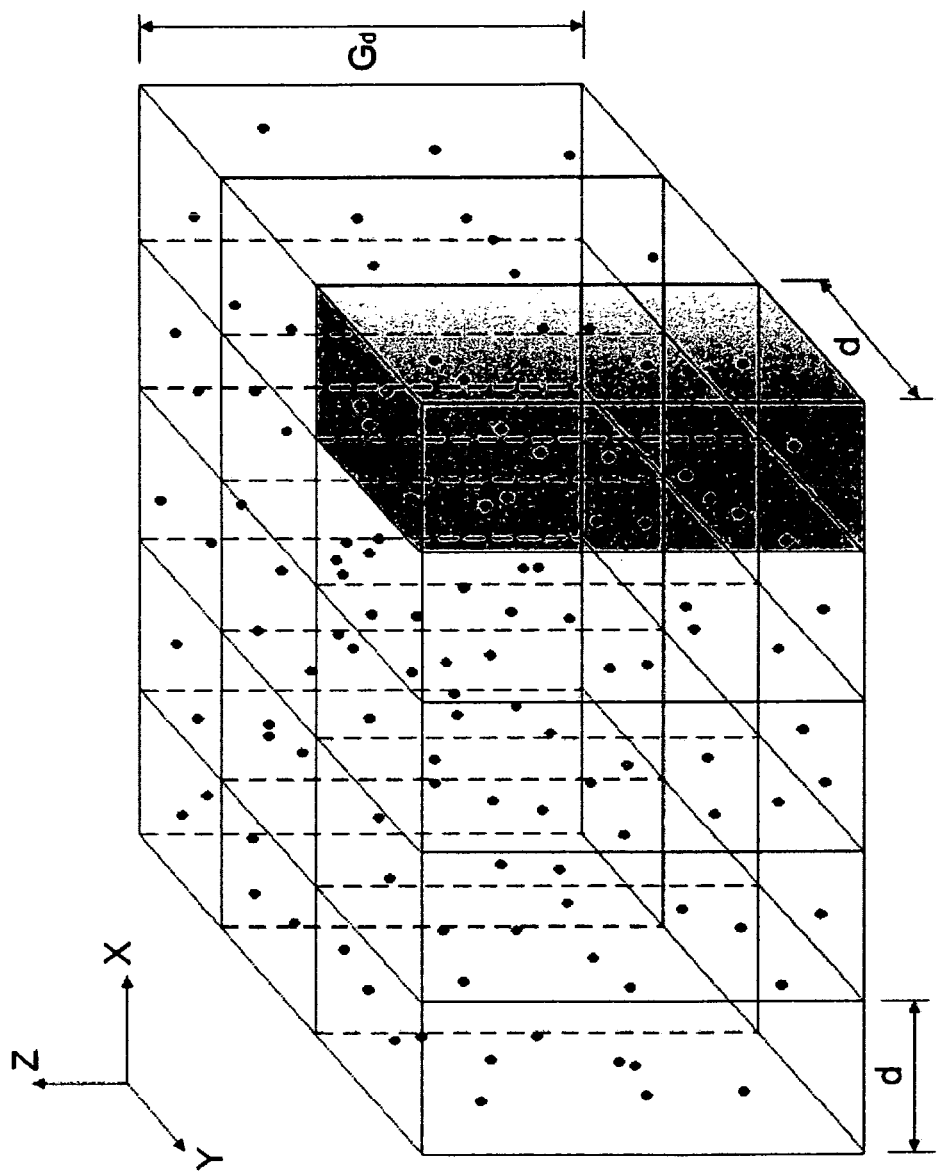
FIG. 11 is a diagram of a two-dimensional grid for stereo perception.

A density grid is an array of cells, either in three dimensions or in two dimensions, where the 3D image density is represented. The most natural way of designing a grid is in a three-dimensional structure as the data obtained with a stereo image collection system 15 is given in a three-dimensional cloud where the coordinates x, y, and z are known. However, the excessive computational load demanded by a three-dimensional grid very often results in a simplification to a two-dimensional grid. The way this simplification is conducted mainly depends on the application pursued. In general, two configurations have turned out to be efficient for vehicle's navigation: a top view arrangement (plane XY) where a look-ahead distance can be set according to navigational needs, and a front view arrangement (plane XZ) where special attention is paid to lateral hazards to the vehicle such as interfering branches or low height agricultural structures. FIG. 10 depicts a three-dimensional array, and FIG. 11 shows a simplification of it leading to a two-dimensional top view configuration.

Three-dimensional grids typically consist of regular cells whose three dimensions are equal (d in FIG. 10), but when downgraded or converted to two dimensions, several slices merge to constitute a unique cell in one of the dimensions. FIG. 11 represents a horizontal grid (plane XY) where the cells have the same dimensions for x and y (d), but the z dimension is much larger ($G_d$), as a result of merging several planes into one unique slice. The magnitude of the z dimension of the cell is known as the depth of the (two-dimensional) grid ($G_d$), and the size of the x and y dimension of the cell is denoted by d, or cell size. The number of cells in the grid is one measure of the grid's resolution (5×3 in FIG. 11; 5×3×3 in FIG. 10). The depth of a two-dimensional grid limits the thickness of the space under consideration. If, for example, in one application orchards are to be sensed for autonomous navigation along the rows between the trees, the portion of the three dimensional cloud associated with the ground can be neglected because the key information is contained in the trees and not the ground. Likewise, for 3-meter high trees, a slice defined between 0.5 meters and 3 meters will probably enclose the important information needed for guiding the vehicle between the rows without running over the trees. Neglecting non-essential data increases the speed and efficiency of the process. The size of the cell, d, directly related to the grid's resolution, determines the size of the objects that can be detected. Consequently, there is a compromise when selecting the cell size: low-resolution grids (large cells) do not distinguish small objects, but high-resolution grids will result in a heavy computational load. In two-dimensional grids, cell size and grid depth determine the volume of the cells ($V = G_d \cdot d^2$). In three-dimensional regular grids, the cube of the cell size gives the volume of each cell ($V = d^3$). In practical applications it is desirable to manipulate these parameters with certain flexibility to ensure an optimum performance of the system. In-field parameter tuning is essential to establish the best properties of the grid. In one example, to detect obstacles that are approximately one meter high, the density grid was designed following a two-dimensional top view configuration, where the depth of the volume of interest ranges from 300 millimeters to 2000 millimeters, and the cell size was set to 125 or 150 millimeters.

The method of image processing and imaging system described herein facilitates the ability of a utility vehicle (e.g., autonomous utility vehicle) or robot to reach a target point in a scene, while avoiding the obstacles encountered in the vehicle's way. The objects or obstacles were detected by means of a stereo algorithm based on density maps to distinguish false positive or false negative objects in a reliable manner.

Having described various preferred embodiments, it will become apparent that various modifications can be made without departing from the scope of the invention as defined in the accompanying claims.

The following is claimed:

1. A method for processing stereo vision data using image density, the method comprising:
   collecting, by an image collection system, image data comprising left image data and right image data of a particular scene;
   estimating an evaluated three dimensional image density rating for one or more respective evaluated volumetric cells within the particular scene;
   estimating a reference three dimensional image density rating for corresponding reference volumetric cell within the particular scene at a reference range from an imaging unit;
   compensating, using an image processor, for the change in image density rating between the reference volumetric cell and each evaluated volumetric cell by using a compensated image density rating based on a range or relative displacement between the reference volumetric cell and the evaluated volumetric cell, and by establishing a compensation curve as a function of compensated three dimensional image density versus range, for volumetric cells between the reference volumetric cell and the evaluated volumetric cell; and
   identifying a presence or absence of an obstacle in a particular compensated volumetric cell in the particular scene if the particular compensated volumetric cell meets or exceeds a minimum three dimensional image density rating.

2. The method according to claim 1 wherein the evaluated three dimensional image density rating comprises the number of stereo matched points or pixels within the first volumetric cell; and the reference three dimensional image density rating comprises the number of stereo matched points or pixels within a second volumetric cell.

3. The method according to claim 1 wherein the volume of the volumetric cells remains constant prior to and after the compensation for the change in image density rating.

4. The method according to clam 3 wherein the reference three dimensional image density comprises an image density associated with at least one of an average range, a mode range, or a mean range.

5. The method according to claim 4 wherein the compensating applies to volumetric cells having a further range from the imaging unit than the reference volumetric cell.

6. The method according to claim 5 wherein the compensating is not applied to volumetric cells having closer range from the imaging unit than the reference volumetric cell.

7. The method according to claim 1 wherein the compensating comprises establishing a compensation curve that is a function of baseline between a left imaging unit and a right imaging unit of the imaging unit, focal length of the imaging unit, and pixel size of the imaging unit.

8. The method according to claim 1 wherein the compensating conforms to the following equation:

$$d3D_C(Y) = d3D(Y) \cdot \frac{d3D_{TH}(Y_R)}{d3D_{TH}(Y)},$$

where the $d3D_c(Y)$ is the compensated three dimensional image density as a function of the range Y, $Y_R$ is the reference range, where $d3D_{TH}=K_s \cdot 10^5 \cdot Y^{-2}$, and where $$K_s = \frac{b \cdot f}{w},$$

where w is the pixel size, b is the baseline, f is the focal length of the lenses of the imaging unit.

9. A system for processing stereo vision data using image density, the system comprising:
  an image collection system for collecting image data comprising left image data and right image data of a particular scene;
  an estimator for estimating an evaluated three dimensional image density rating for one or more respective evaluated volumetric cells within the particular scene and for estimating a reference three dimensional image density rating for corresponding reference volumetric cell within the particular scene at a reference range from an imaging unit;
  an image density compensator for compensating for the change in image density rating between each reference volumetric cell and an evaluated volumetric cell by using a compensated image density rating based on a range or relative displacement between the reference volumetric cell and the evaluated volumetric cell, and wherein the image density compensator establishes a compensation curve as a function of compensated image density versus range for volumetric cells between the reference volumetric cell and the evaluated volumetric cell; and
  an object detector for identifying a presence or absence of an obstacle in a particular compensated volumetric cell in the particular scene if the particular compensated volumetric cell meets or exceeds a minimum three dimensional image density rating.

10. The system according to claim 9 wherein the evaluated three dimensional image density rating comprises the number of stereo matched points or pixels within the first volumetric cell; and the reference three dimensional image density rating comprises the number of stereo matched points or pixels within a second volumetric cell.

11. The system according to claim 9 wherein the volume of the volumetric cells remains constant prior to and after the compensation for the change in image density rating.

12. The system according to claim 9 wherein the reference three dimensional image density comprises an image density associated with at least one of an average range, a mode range, or a mean range.

13. The system according to claim 12 wherein the image density compensator applies compensation for intra-image density variation to volumetric cells having a further range from the imaging unit than the reference volumetric cell.

14. The system according to claim 13 wherein the image density compensator does not apply compensation for intra-image density variation for volumetric cells having closer range from the imaging unit than the reference volumetric cell.

15. The system according to claim 9 wherein the image density compensator comprises establishing a compensation curve that is a function of baseline between a left imaging unit and a right imaging unit of the imaging unit, focal length of the imaging unit, and pixel size of the image collection system.

16. The system according to claim 9 wherein the image density compensator conforms to the following equation:

$$d3D_C(Y) = d3D(Y) \cdot \frac{d3D_{TH}(Y_R)}{d3D_{TH}(Y)},$$

where the $d3D_c(Y)$ is the compensated three dimensional image density as a function of the range Y, $Y_R$ is the reference range, where $d3D_{TH}=K_s \cdot 10^5 \cdot Y^{-2}$, and where $$K_s = \frac{b \cdot f}{w},$$

where w is the pixel size, b is the baseline, f is the focal length of the lenses of the image collection system.

* * * * *